United States Patent [19]

Liu

[11] Patent Number: 5,282,274

[45] Date of Patent: Jan. 25, 1994

[54] TRANSLATION OF MULTIPLE VIRTUAL PAGES UPON A TLB MISS

[75] Inventor: Lishing Liu, Pleasantville, N.Y.

[73] Assignee: International Business Machines Corporation, Armonk, N.Y.

[21] Appl. No.: 528,634

[22] Filed: May 24, 1990

[51] Int. Cl.$^5$ ............... G06F 12/00; G06F 12/06; G06F 12/10

[52] U.S. Cl. .................. 395/400; 395/425; 364/DIG. 1; 364/DIG. 2

[58] Field of Search ........................ 395/400, 425

[56] References Cited

U.S. PATENT DOCUMENTS

| | | | |
|---|---|---|---|
| 4,285,040 | 8/1981 | Carlson et al. | 395/400 |
| 4,491,911 | 1/1985 | Sato | 395/400 |
| 4,493,026 | 1/1985 | Olnowich | 395/425 |
| 4,563,737 | 1/1986 | Nakamura et al. | 395/400 |
| 4,638,426 | 1/1987 | Chang et al. | 395/400 |
| 4,648,033 | 3/1987 | Lewis et al. | 395/400 |
| 4,654,777 | 3/1987 | Nakamura | 395/400 |
| 4,680,700 | 7/1987 | Hester et al. | 395/400 |
| 4,691,281 | 9/1987 | Furui | 395/400 |
| 4,695,950 | 9/1987 | Brandt et al. | 395/400 |
| 4,731,740 | 3/1988 | Eguchi | 395/400 |
| 4,860,192 | 8/1989 | Sachs et al. | 395/400 |
| 4,875,160 | 10/1989 | Brown, III | 395/400 |
| 4,910,668 | 3/1990 | Okamoto et al. | 395/400 |
| 4,926,323 | 5/1990 | Baror et al. | 395/400 X |
| 4,961,135 | 10/1990 | Uchihori | 395/400 |

OTHER PUBLICATIONS

S. A. Ward et al., "Computation Structures" (copyright 1990, MIT Press/McGraw-Hill Book Co.), pp. 486–497.

D. A. Patterson et al., "Computer Architecture—A Quantitative Approach" (copyright 1990: Morgan, Kaufmann Publishers), pp. 432–438.

IBM System/370 Extended Architecture—Principles of Operation, IBM Publication Number SA22-7085-1, Second Edition, Jan. 1987 (copyright 1987, International Business Machines Corp., pp. 3-21 to 3-36.

*Primary Examiner*—Joseph L. Dixon
*Assistant Examiner*—Michael A. Whitfield
*Attorney, Agent, or Firm*—Peter L. Michaelson; Raymond R. Moser, Jr.

[57] ABSTRACT

Apparatus, and accompanying methods for use therein, for translating virtual page addresses in one address space, e.g. virtual, to page addresses in a second address space, e.g. real, and specifically for increasing the speed of such translations by translating multiple contiguous virtual page addresses upon the occurrence of a miss in a translation lookaside buffer (TLB). In response to a TLB miss, the address of each virtual page in a predefined block of, e.g. four, contiguous virtual pages, is separately translated through segment and/or page table lookup operations to yield corresponding page frame addresses. The virtual and corresponding page frame addresses for this block are then stored within a single TLB entry. Inasmuch as successive virtual page addresses can be constructed through simple incrementation of a starting virtual page address for this block, a TLB entry contains the first virtual page address for the block followed by the separate page frame address, and its associated invalid and page protection bit fields, for each of the contiguous virtual pages in that block. Since segment and block values are the same for all the page frame addresses in each block, these values are only stored once within the corresponding TLB entry for that block.

28 Claims, 5 Drawing Sheets

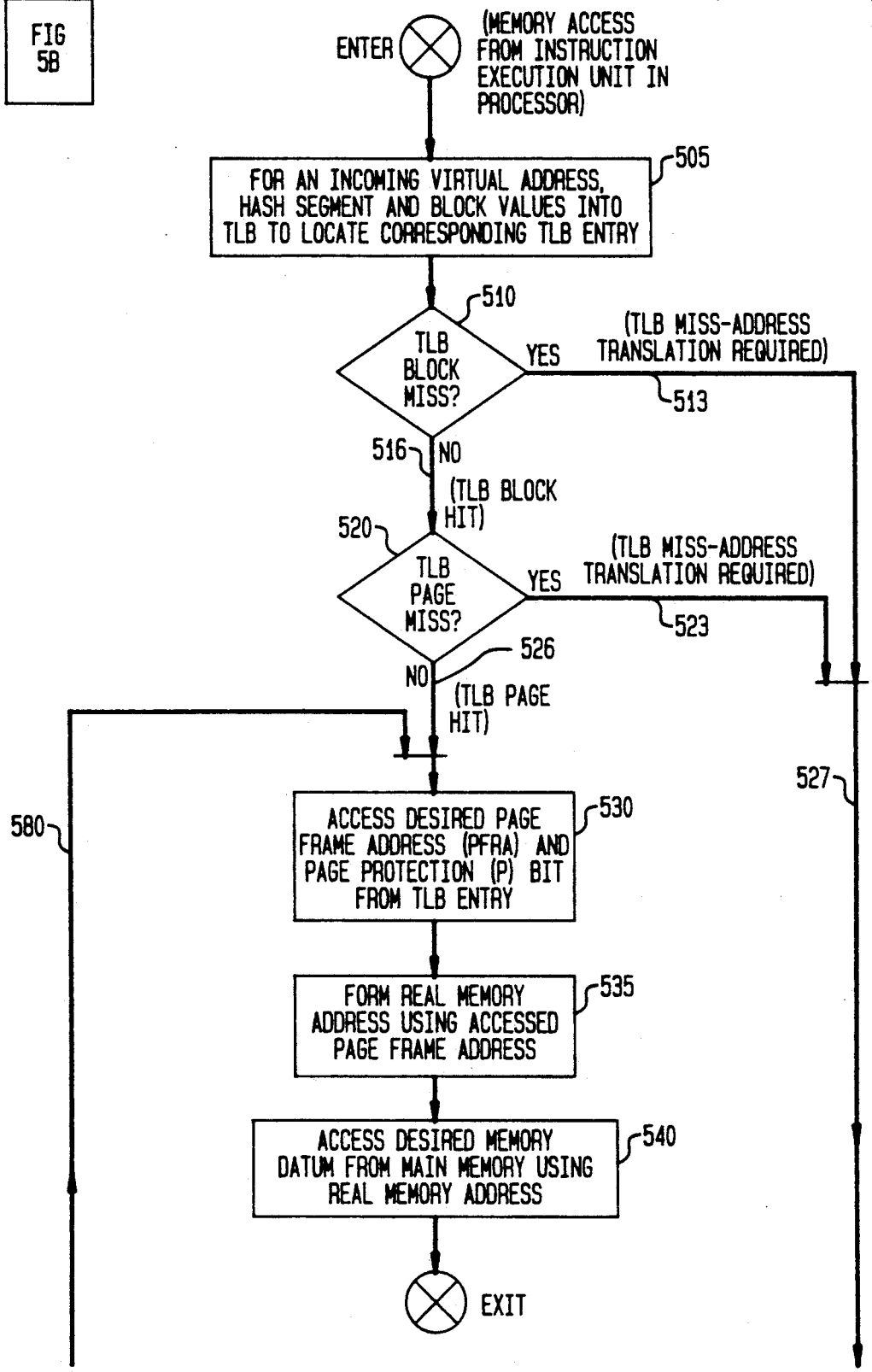

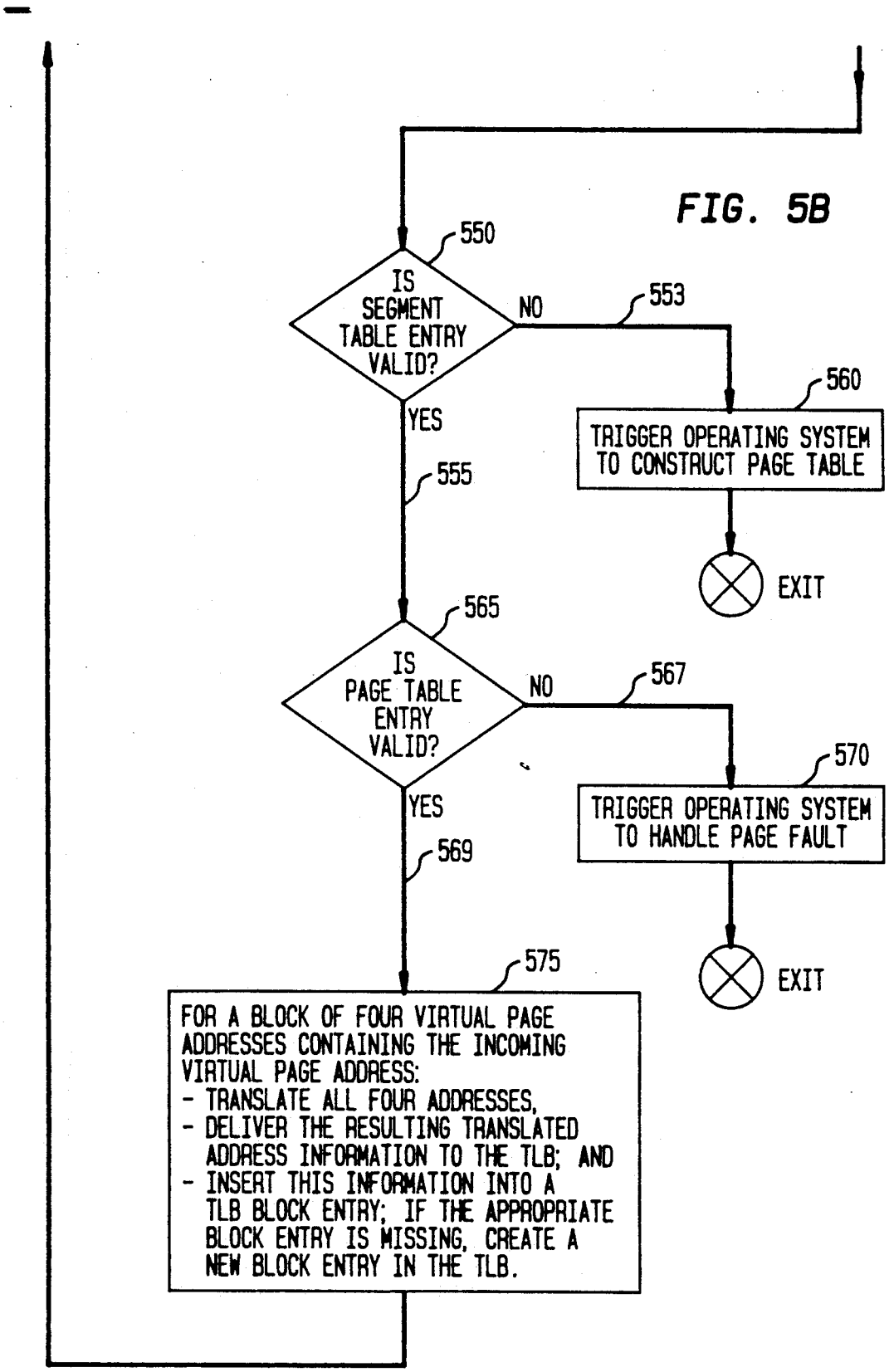

TRANSLATION OF MULTIPLE VIRTUAL PAGES UPON A TLB MISS

BACKGROUND OF THE INVENTION

1. Field of the Invention

The invention relates to apparatus, and accompanying methods for use therein, for translating virtual memory page addresses to real page addresses and specifically for increasing the speed of such translations by translating multiple contiguous virtual page addresses upon the occurrence of a miss in a translation lookaside buffer (TLB).

2. Description of the Prior Art

Most modern computer systems, particularly mainframe computers, employ high speed random access (RAM) memory circuits as main memory and relatively slow mass memory devices, such as hard disk or magnetic tape drives, as auxiliary (mass) storage. The disparity in access times between random access memory and disk or tape drives is substantial and severe, with the former having access times ranging on the order of tenths of microseconds or less while the latter has access times often ranging on the order of at least tens of milliseconds. Given this disparity, user programs are not executed from auxiliary storage, but rather are transferred therefrom into main memory for execution therein.

In practice, considerations of cost, physical circuitry size and/or power requirements frequently limit the amount of RAM memory that is used in implementing a main memory to a finite real address space which is often substantially less than the maximum address space of a processor that is to access this memory. For example, a processor that operates with a 31 bit virtual address word, which inherently possesses the capability of separately addressing $2^{31}$ (over 2 billion) bytes, may often operate with as little as a few Mbytes of actual RAM memory. To provide sufficiently rapid execution speeds, the available RAM memory must be shared among all current user programs that are executing on the processor as well as with a resident portion of the operating system used by the processor. Unfortunately, the RAM memory is rarely, if ever, sized sufficiently large to fully accommodate all the instructions and data that form each such user program and the resident portion of the operating system.

However, it has been recognized quite early in the art that, that through normal operation of instruction fetches and stack and data accesses and standard programming techniques, most program instructions possess a rather good spatial locality of reference. This means that at memory location x in an executing user program, that program will exhibit a strong tendency to interact within relatively small time delays with different but nearby memory locations, such as locations $x+1$, $x+2$ and so on. This behaviour, often involving preceding instructions, e.g. locations $x-1$, $x-2$ and so on, is clearly evident in loops and other similar program structures. Although the organization of external data is often not as constrained by the architecture of the processor as are the stack and instruction accesses, such data, particularly arrays, are stored in contiguous memory locations and, as such, often exhibit considerable spatial locality. In this regard, certain programmed operations, such as illustratively clearing, transposing, adding or array multiplication, that at any instance utilize one element of an array will likely access other elements of the array within a short time. Similarly, the art has recognized that instructions and data often exhibit a good temporal locality of reference as well, i.e. where the same memory location is repeatedly accessed over time.

Given these recognitions regarding spatial and temporal localities, the art has turned to and now widely uses a number of memory techniques that attempt to share a relatively small amount of real memory among a number of currently executing user programs, each of which is capable of addressing a much larger memory space.

One such technique is paging. Here, in essence, different finite portions, i.e. "pages", of memory data (collectively including both instructions and data values) for each user program, rather than all the memory data for that program, are successively copied ("swapped") from auxiliary storage into main memory and then used for current execution. Owing to spatial and temporal localities, the main memory contains pages of memory data that not only possess memory locations that have just been recently accessed but also locations that are expected to be subsequently accessed within a very short delay time. With a well designed paging system, the vast majority of memory access time should be spent accessing memory data located within pages previously copied into main memory with relatively little access time being spent in copying new pages of memory data from auxiliary storage.

Specifically, whenever the processor attempts to access memory while executing a user program, the processor issues a so-called "virtual address" for a desired memory datum that is to be accessed. The size of the virtual address is generally only limited by the maximum address space of the processor that is allowed for program usage. By contrast, a so-called "real" or "physical" address is used to directly access memory in order to locate the desired memory datum stored therein. Since the virtual address of any given memory datum is not necessarily the same as its corresponding real address, a translation facility, provided by the operating system and generally transparent to any executing user program, translates each virtual address issued by the processor to a corresponding real address prior to accessing main memory in order to obtain this datum.

Both virtual and real memory space are divided into fixed sized areas or segments, each of which is, in turn, divided into a number of contiguous pages. Each page is formed of a predefined number of memory locations, typically ranging between 2 to 4K bytes. Though pages for any program are contiguous in virtual memory; the corresponding physical pages for that program, being swapped into and out of main memory as required by the operating system during on-going program execution, tend to be randomly scattered throughout main memory. A physical page in main memory is often referred to as a "page frame".

The random location of page frames in main memory necessitates that the operating system maintains address translation, specifically and illustratively segment and page, software tables and an address translation process which utilizes these tables for use in translating virtual to real addresses. These tables and the translation process collectively form the address translation facility. For each virtual page copied from auxiliary storage as a page frame into main memory, the address translation tables store its virtual page address along with its corresponding page frame address. Inasmuch as memory locations within any page, whether virtual or real, are contiguous, then through these tables, a virtual address located within such a virtual page can be mapped into a physical address of a location residing in main memory.

Given this virtual addressing scheme, whenever the processor attempts a memory access for a given memory datum during execution of a user program, the processor issues a virtual address for that datum. The datum may currently reside in main memory or it may not. If the datum resides in the main memory, the virtual to real address correspondence for that datum exists in the page and segment tables. As such, the address translation process, upon accessing these tables, extracts the physical address of the datum and thereafter applies this address to the main memory. Once this datum has been accessed, user program execution proceeds accordingly.

If, however, the desired datum does not currently reside within the main memory because a page containing that datum has not yet been swapped into main memory, then no valid entry for its associated virtual page exists in the page and segment tables. As such, the datum must be retrieved from the auxiliary store. Accordingly, the address translation process, upon accessing these tables using that virtual address, produces a page fault. At this point, interpretation of a current instruction (which caused the page fault) halts, the current state of processor is saved and the processor transfers execution to a software page fault handler. Rather than accessing and copying only the desired datum from auxiliary storage, the page fault handler translates the incoming virtual page address and then, through input/output controller(s) for an appropriate mass storage device(s), copies an entire page containing that desired datum from auxiliary storage as a page frame into main memory. Thereafter, the fault handler updates the segment and page tables accordingly with new corresponding virtual and real addresses for this page. Execution then returns from the fault handler to the address translation process which, in turn, accesses the desired datum from the newly copied page. When appropriate, the fault handler, as well as other well known components of the operating system, will subsequently resume execution of the current program instruction that generated the page fault.

If pages are correctly sized, then the spatial and temporal localities inherent in most programs within a given virtual page should be very high. Hence, one would then expect that the average access time to a paged memory system consisting of a main memory having a few Mbytes of RAM, an auxiliary store containing a few billion bytes of disk memory and with correctly sized pages should only be slightly longer than but nevertheless remain on the same order as that of the RAM memory. However, disadvantageously and under various circumstances, the access time to such a paged memory system can lengthen considerably.

In particular, translating a virtual address, even if accomplished through use of microcode rather than purely software, often requires several memory accesses into the software based segment and page tables as well as a number of other well known processing steps that collectively may consume upwards of typically 5 to 100 machine cycles to fully accomplish. For that reason, the address translation process tends to be relatively slow and add significant overhead to memory access and instruction execution times. Hence, if the full address translation process were to be performed for every virtual address, then these times would be slowed considerably which, in turn, would substantially decrease the throughput of the computer. Therefore, in an attempt to substantially eliminate the need to perform the entire address translation process for every virtual address, the art has turned to the use of translation lookaside buffers (TLBs). These buffers, in hardware, store recently used virtual page addresses along with their corresponding page frame addresses. Once a virtual page address has been fully translated, this virtual address along with its corresponding physical page frame address are stored in a common entry in the TLB for subsequent use.

TLBs also exploit locality inasmuch as a significant likelihood often exists that after a first memory access has occurred to a virtual address associated with a location within a given page frame, subsequent accesses to virtual locations associated with and located within the same page will occur after a relatively short delay time. Since the relative position of a virtual location within a page of virtual memory is the same as the relative position of a corresponding physical location within a corresponding page frame in physical memory, the same TLB entry can be used in translating any virtual location within a given virtual page to a physical location within a corresponding page frame. As such, low order virtual address bits are merely appended as low order real address bits onto the accessed real page address generated from the TLB to generate a real memory address. For further insight into paged memory systems including the use of TLBs, see S. A. Ward et al, *Computation Structures* (©1990, MIT Press/McGraw-Hill Book Co.) pages 486–497 and D. A. Patterson et al, *Computer Architecture—A Quantitative Approach* (©1990: Morgan Kaufmann Publishers), pages 432–438.

Consequently, when a TLB is in use, then prior to performing full address translation, the address translation process determines whether an incoming virtual page address resides within the TLB. If so, the corresponding page frame address is accessed therefrom and then used to form a real memory address which, in turn, is used to access main memory. If not, full address translation occurs, and a new entry in the TLB is created for the latest virtual page address and its corresponding page frame address. Hence, only those virtual addresses that have virtual page addresses which are not stored in the TLB are fully translated. Advantageously, this, in turn, drastically reduces the number of full address translations that must occur during program execution.

To facilitate rapid address translation, TLBs are typically implemented in hardware as a hashed set-associative table stored in a high speed memory—rather than in software as are page and segment tables. During operation, a TLB typically writes a new entry into a buffer location occupied by the least recently used entry in the TLB. Through the use of address hashing and parallel compares, particularly when performed in dedicated high speed TLB hardware, a single entry in a TLB can be accessed very quickly—often in less than a single machine cycle.

Given the substantial improvement in translation and overall memory access speed gained through the use of a TLB, the art has turned to several techniques aimed at increasing the speed at which a TLB operates. These techniques are typified by that described in, for example, U.S. Pat. No. 4,695,950 (issued to H. R. Brandt et al on Sep. 22, 1987) which discloses the concept of storing intermediate translations using a TLB during a double level address translation and U.S. Pat. No. 4,638,426 (issued to A. Chang on Jan. 20, 1987) which discloses the concept of translating a virtual address into a real address using an intermediate virtual address. Unfortunately, the TLB based addressing schemes disclosed in these patents, as well as that described above and known in the art, possess serious drawbacks.

Being hardware based, TLBs are finite in size. Generally, a TLB contains anywhere between typically 64 to 1024 separate entries with each entry containing approximately 64 bits. As such, a TLB can only store a certain number of the most recently translated virtual page addresses. Owing to the limited size of a TLB, various user programs that operate on large amounts of data, such as large matrices, routinely trigger successive TLB misses. The occurrence of a TLB miss causes the full address translation process, including accessing the segment and page tables and updating the TLB, to be performed along with its concomitant processing delays. If these misses occur frequently enough, then the efficiency gained through the use of a TLB will seriously degrade. Large matrices and other similar data structures engender a large number of TLB misses, therefore producing a large TLB miss ratio and significant processing delays.

In an attempt to counter the loss of performance resulting from processing data that has a high TLB miss ratio, one of two well-known techniques are frequently used. First, one technique calls for greatly increasing the size of the TLB to a size which is believed to significantly reduce the likelihood that a large number of TLB misses will occur. Inasmuch as a TLB is usually located in a critical path in a computer where accessing delays can not be tolerated, a TLB is necessarily implemented with high speed memory circuits which are generally very expensive. Hence, if the size of a TLB were to be greatly increased, then its cost would rise appreciably. In addition, this technique may be ineffective with certain processing applications, such as processing very large matrices or other similar data structures, which even with realistically large TLBs will nevertheless produce a significant number of TLB misses and resulting processing delays caused by translation overhead. A second technique calls for significantly increasing the page size, from, for example, 4K bytes to 1M byte, in an effort to greatly reduce the number of translations and associated overhead that are expected to occur. However, as the page size increases, an increasing amount of memory data must be swapped into and out of main memory during paging but only a small amount of memory data in any one page is usually being accessed at any one time by the processor. As such, increasing the page size causes increasingly inefficient memory usage. Though supercomputers often employ a large page size, the resulting memory inefficiencies effectively preclude use of this technique in a general purpose computer.

Thus a need exists in the art for a technique, particularly suited for use in, though not exclusively limited to, a general purpose computer, for increasing the efficiency of a TLB used in such a computer particularly when that computer is processing programs and/or accessing data which would otherwise generate a high TLB miss ratio. Advantageously, such a technique should not require the use of TLBs of significantly increased size or use of a relatively large page size.

SUMMARY OF THE INVENTION

Consequently, through my invention, I have substantially eliminated the above-described deficiencies in the art that are inherent in translating virtual to real memory addresses using a translation lookaside buffer (TLB) for memory data that heretofore, during its accessing, would generate a relatively large number of TLB misses.

In accordance with the broad teachings of my invention, whenever a TLB miss occurs, a plurality of successive contiguous page addresses in one address space, e.g. virtual addresses, are translated, on a pre-fetch basis, into page addresses in a second address space, e.g. page frame (real) addresses, and then stored in the TLB. Preferably one TLB entry (though more such entries can be used) will hold the real addresses for these multiple contiguous virtual page addresses. This approach sharply contrasts with translating only one virtual page address and storing only that address and its corresponding page frame address within one TLB entry as now occurs in TLBs known in the art.

My invention exploits my observation that the occurrence of spatial and temporal localities of reference is not limited to merely encompassing memory data that occurs within a single virtual page, i.e. at a relatively fine granularity, but rather extends, at levels of increasingly large granularity, to encompass memory data that resides in a series of successively contiguous virtual pages. Hence, after a TLB miss occurs for a given virtual address in a given page, then a relatively high likelihood exists that, within a relatively short delay time thereafter, addresses located within a series of virtual pages that are contiguous to the given virtual page will also be accessed as well and require translation. Hence, by translating multiple successive contiguous virtual page addresses into corresponding page frame addresses on a pre-fetch basis at each TLB miss—as taught by my invention, the number of TLB misses that would typically occur during program execution could be significantly reduced over that which would otherwise occur in the art. Consequently, for large matrices or other programs and/or data structures that heretofore engender a large number of TLB misses, use of my invention would advantageously reduce both the number of TLB misses that would otherwise occur and the concomitant processing overhead and delay otherwise required to process these programs and/or access this data.

Therefore, in accordance with the specific teachings of a preferred embodiment of my invention, a block of virtual page addresses are translated in response to a page miss in a TLB. Each block has a fixed number of, illustratively four, consecutive contiguous virtual page addresses. The first virtual page address in the block and preferably occurring at a lower block partition is translated through segment and page table lookup operations to yield a corresponding page frame address. Inasmuch as successive virtual pages are contiguous in virtual address space, then, given an address for a first virtual page in a block, each successive virtual page address in that block can be readily formed by simply incrementing the address of the first virtual page to access each successive entry in the page table for the block. As such, due to the contiguous nature of virtual pages, each successive virtual page in the block is translated through page table lookup operations to yield corresponding page frame addresses. All the virtual and corresponding page frame addresses for the pages in the block are then stored within the TLB.

Furthermore, my invention can be advantageously used not only in translating just virtual to real page addresses but also in translating real to virtual addresses for use in those computers where inverted segment and page tables are used.

In accordance with a feature of my invention, each individual entry in the TLB contains the first virtual page address in a block followed by page frame addresses for all the contiguous virtual pages i.e.—the first and each successive virtual page—in that block. An "invalid" bit is associated with each of these page frame addresses to indicate whether that page frame address is meaningful or not. Inasmuch as segment and block values are the same for all the page frame addresses in each block, these values are stored once within any one TLB entry.

In this regard, I have determined that a significant reduction in TLB misses occurs where each TLB entry contains as few as four successive page frame addresses. In this instance, use of my inventive apparatus requires that a TLB contains approximately twice the storage capacity of a conventional TLB, but does not require any change in page size. Since the expense associated with doubling the capacity of a TLB is often quite small and simple table lookup operations, as noted above, are needed to translate multiple contiguous virtual page addresses rather than just one such address upon each TLB miss, my inventive apparatus and methods can be easily and inexpensively incorporated into a general purpose computer to likely produce, in many instances, a significant reduction in the number of TLB misses. Alternatively, if the size of a TLB is to remain constant, then, through use of my invention, the TLB can store page frame addresses for twice as many virtual pages as has previously occurred in TLBs known in the art. Moreover, since multiple contiguous page frame addresses can be easily extracted from a TLB entry through a simple bulk shifting operation, no time consuming hashing processes are needed to store and subsequently access each of these page frame addresses from the TLB.

BRIEF DESCRIPTION OF THE DRAWINGS

The teachings of the present invention may be readily understood by considering the following detailed description in conjunction with the accompanying drawings, in which:

FIG. 5 depicts the correct alignment of the drawing sheets for FIGS. 5A and 5B; and FIGS. 5A and 5B collectively depict an overall high level flowchart of Memory Access and TLB Entry Creation Process 500 that also embodies the teachings of my present invention.

To facilitate reader understanding, identical reference numerals have been used, where possible, to denote identical elements that are common to the figures.

DETAILED DESCRIPTION

After reading the following description, those skilled in the art will clearly realize that although my invention is directed to use in a general purpose computer, my invention could be used in conjunction with nearly any computer to increase the speed of translating virtual to real addresses using a translation lookaside buffer (TLB). Nevertheless, where appropriate and for purposes of specific illustration, my invention will be discussed below in the context of use in an IBM model 370/Extended Architecture general purpose mainframe computer manufactured by the International Business Machines Corporation of Armonk, N.Y. (IBM is a registered trademark of the International Business Machines Corporation).

Now, to fully appreciate the teachings of my present invention, I will first discuss the rudiments of paged memory systems that can be used in any general purpose mainframe computer. Then, I will discuss the manner through which an illustrative computer, such as an IBM model 370/Extended Architecture mainframe computer, currently translates virtual addresses into real addresses to implement a paged memory system. Thereafter, I will conclude with a detailed discussion of my invention, particularly as it could be used in this illustrative computer.

Figure 1:
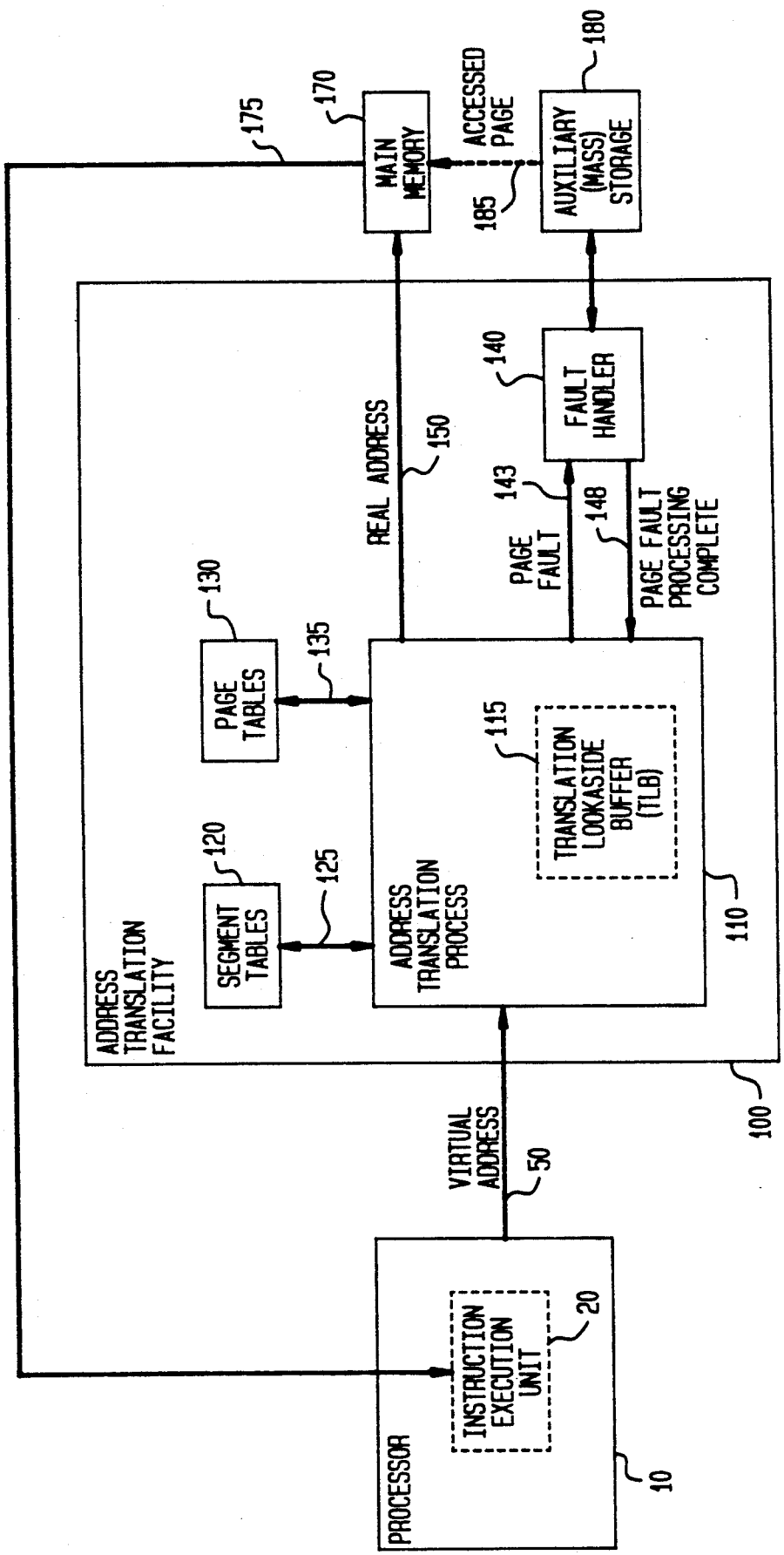
FIG. 1 depicts a high level diagram of various components for performing memory access operations, and specifically including those components which translate virtual to real addresses and are typically used in a general purpose mainframe computer.

Specifically, FIG. 1 depicts a high level diagram of various components for performing memory access operations, and specifically including those components which translate virtual to real addresses and are typically used in a general purpose mainframe computer. As shown, these components include processor 10, address translation facility 100, main memory 170 and auxiliary (mass) storage 180. Processor 10, main memory 170 and auxiliary store 180 are all implemented in specialized hardware. Main memory 170 is typically implemented using high speed random access (RAM) memory circuits; while auxiliary storage 180 is typically formed of magnetic tape and hard disk drives. The disparity in access times between main memory 170 and auxiliary storage 180 is substantial and severe, with the former having access times ranging on the order of tenths of microseconds or less while the latter has access times often ranging on the order of at least tens of milliseconds.

User programs are executed by processor 10 and specifically by instruction execution unit 20 contained therein. During the execution of a user program using a paged memory system, processor 10 issues a virtual address of a memory location in order to obtain a memory datum (collectively including both instructions and data values) stored thereat. In executing certain instructions, processor 10 may operate in a real addressing mode, thereby generating a real memory address—for which address translation is not required. Hence, for purposes of illustration and for simplifying the following discussion, this discussion will hereinafter assume that processor 10 is operating in a virtual addressing mode. The virtual address space available for a user program is only limited by the maximum address space of the processor. However, the virtual address does not necessarily equal the real address in main memory 170 at which this datum is actually stored. The real address space is limited, not by processor 10, but rather by the capacity of main memory 170. Accordingly, address translation facility 100 is used to translate the virtual address provided by processor 10 over path 50 into a real or "page frame" address that is applied to path 150 and which can be used in accessing main memory 170. The resulting memory datum generated by main memory 170 is then routed, via path 175, back to processor 10 for subsequent use by instruction execution unit 20 during program execution. Address translation facility 100 is often implemented using a combination of well-known specialized hardware, microcode and software. This software generally forms part of the operating system (not shown but well known) that is executed by instruction execution unit 20 to control the operation of the computer. The usage of the address translation facility, particularly if the facility is well designed, is typically transparent to the execution of user programs by processor 10 and generally, but not always as will be discussed below, imparts relatively little processing delay to the execution time of these programs.

Address translation facility 100 contains address translation process 110 which is typically implemented in microcode, fault handler 140 which is usually implemented in software as part of the operating system, and segment and page tables 120 and 130 which are usually stored within main memory 170. Inasmuch as tables 120 and 130 are an integral part of address translation and are accessed by address translation process 110, then, for ease of understanding, these tables have been shown within facility 100. In addition, address translation process 110 also accesses translation lookaside buffer 115, which though shown within process 110, is actually implemented typically as a hashed set associative buffer using dedicated high speed memory circuits separate from those used in main memory 170. Because of the overwhelming importance of the TLB in increasing the speed of program execution, as will become clear below, the TLB is normally located in a so-called "critical path" in the computer.

In operation, the segment and page tables contain a memory mapping which converts a virtual page address into a page frame address for each user currently executing a program on processor 10. Specifically, after a user instructs the operating system to begin executing a program, the operating system then determines whether segment and page tables exist for that user. If not, the operating system then builds these tables within main memory 170 and stores these tables within allocated page frames in main memory. Each such user is assigned one segment table. A register (not shown but well known) located within processor 10 is also assigned to that user and contains the starting real address (also referred to as segment table origin or simply "STO") of the associated segment table assigned to this user. The segment table, as will be explained in detail below in connection with FIG. 2, contains entries that point to the origins of page tables. A user has at least one and sometimes multiple page tables. Each page table contains a corresponding page frame address for each virtual page address stored within the table. Each entry within the segment and page tables contains a bit, i.e. a "invalid bit", which indicates whether that entry is "valid", i.e. meaningful, or not. If an entry is not currently valid, then, in the absence of being initialized, that entry has no valid meaning and is not used by the operating system. Alternatively, if an entry is valid, then the operating is subsequently able to use this entry during address translation. Since the address of any memory datum located within both a virtual and its corresponding page frame, relative to the origin (partition) of the associated page, is the same for both the virtual and real pages, only the virtual page address bits in a virtual address need to be translated into page frame address bits. The low order address bits that provide addressing within a page, i.e. byte index bits, are merely copied from the virtual to the real addresses, as described in detail later.

Once the operating system builds the segment and page tables or confirms their existence for the user, the operating system begins actual program execution. Inherent in this execution is address translation. Although usually generally transparent to the user, each virtual address issued by instruction execution unit 10 is first translated during program execution by facility 100 into a page frame address for subsequent use in accessing main memory 170. In particular, after a virtual address is issued by the processor, that address is routed, as symbolized by path 50, to address translation process 110 located within facility 100. Process 110 first determines whether TLB 115 contains an entry for the virtual page address appearing on path 50. If such an entry exists, then the TLB accesses this entry and returns the corresponding page frame address stored therein to process 110. Process 110 then appends the low order byte address bits (byte index bits) from the virtual address to the right of the page frame address in order to form a complete real address. That address is then routed over path 150 to main memory 170 for use in subsequently accessing an addressed memory location residing therein. In many modern computer systems, main memory 170 contains appropriate high speed memory buffers, i.e. so-called caches, to significantly increase the access speed of the main memory. Typically, where used, such caches are first interrogated using a translated virtual address, i.e. a resulting real address, to yield an accessed memory datum. Use of a TLB, in conjunction with a cache, can noticeably increase the speed at which memory data can be retrieved from the cache. Since memory data access facilities, such as caches, which are used within main memory 170 are well known in the art, these facilities will not be discussed any further.

Alternatively, if process 110 concludes that TLB 115 does not contain an entry for this virtual page address, then address translation process 110 must undertake full address translation to generate the needed page frame address. To do so, process 110 accesses the segment and page tables for the current user to locate the specific page table entry for the incoming virtual page address. If the invalid bit in an entry accessed from the segment table is set to zero, then this entry is currently valid for this user. Then, using, inter alia, a page table origin (PTO) stored within this segment table entry, process 110 accesses a specific entry in an associated page table and reads a corresponding page frame address from this entry. If the invalid bit contained within this page table entry is set to zero, then this page table entry is valid for this user. This indicates that the virtual page that is being addressed has a corresponding page frame residing within main memory 170. As such, the page frame address is simply read from this page table entry. While virtual pages are contiguous in virtual address space for any user program, corresponding page frames for that program, being swapped into and out of main memory as required by the operating system during on-going program execution, tend to be randomly scattered throughout main memory. Accordingly, each entry in the page table contains the complete page frame address for that page. Hence, with a valid page table entry, process 110 obtains the corresponding page frame address from the page table entry. The low order virtual address bits are then appended to this corresponding page frame address to yield a real address that is applied, via path 150, to main memory 170.

Now, in the event that the accessed entry in either the segment or page tables for the user contains a invalid bit that is not set and hence indicates an "invalid" state for that entry, then address translation process 110 issues an appropriate interrupt (well known and not shown) to signify a respective segment or page table fault. On the one hand, for an invalid segment table entry, this means that a page table, which would be expected to contain an entry for the current virtual page address being translated, simply does not exist in main memory 170. Since the page table does not exist, then clearly an expected entry in that table for the particular virtual page being translated does not exist as well. In this case, the operating system would now build the page table. Once the page table is created, the invalid bits in all of its entries would be reset to reflect an invalid condition. On the other hand, an invalid page table entry indicates that a corresponding page frame for the particular virtual page address being translated simply does not yet exist within main memory 170. Therefore, in either situation, as a result of just building the page table based upon an invalid segment table entry or attempting to access an invalid page table entry, the operating system realizes that the requested page does not reside within main memory 170 and issues a "page fault". In response to this fault, fault handler 140 obtains the missing page from auxiliary storage 180. Specifically, upon issuance of a page fault by process 110, this process instructs the operating system to halt execution of the current instruction by instruction execution unit 20. The current state of processor is then saved by the operating system. Processor 10 then transfers execution, as symbolized by path 143, to page fault handler 140. The page fault handler triggers certain system software functions to identify whether there is a copy of the faulted page in auxiliary storage. If not, a new page frame (normally cleared as zeros) is allocated within main memory 170. Otherwise proper input/output operations are initiated through input/output controller(s) (well known and not shown) associated with auxiliary storage 180, and a desired page from the auxiliary storage is copied ("swaps"), as symbolized by dashed line 185, into a newly allocated page frame within main memory 170. One or more well known algorithms, which are not relevant here, are executed by the operating system to identify that specific page frame which is to be allocated. Inasmuch as the processor will likely be executing one or more other user programs while a page is being swapped into main memory 170, execution of the specific user program that generated the page fault will often not resume immediately upon completion of the swap. In this case, upon completion of the swap, various well known components (well known and not relevant here) of the operating system will update the page tables accordingly with new corresponding virtual and real addresses for this new page frame, "ready" the specific user program and then place that program in a dispatchable state from which the program will eventually be dispatched to the processor and then resume execution. After the page tables have been appropriately updated, then the fault handling process concludes with execution returning to process 110, as symbolized by path 148. Once program execution subsequently resumes at the instruction that generated the page fault, process 110, in certain instances not relevant here, completes the full address translation process, by simply accessing through the segment and page tables, to obtain the page frame address of the desired datum from the newly copied page and applies this address, via path 150, to main memory 170. In addition, process 110 updates TLB 115 by creating a new entry therein which contains the virtual and real page frame addresses for this particular virtual page that has just now been accessed. Specifically, dedicated high speed hardware (well known and not specifically shown) that is used in conjunction with TLB 115 stores this entry in the TLB itself by overwriting the least recently used (LRU) buffer entry therein.

Though the process, discussed above, of swapping pages from auxiliary storage 180 into main memory 170 in response to a page fault does not form part of the invention, it has been described, at least on a simplified basis, to provide a full understanding of the overall address translation process. However, for simplification, the following discussion will assume, unless specifically noted otherwise, that all virtual pages for which translation is being requested, have already been swapped into main memory 170 and have corresponding entries in segment tables 120 and page tables 130.

Figure 2:
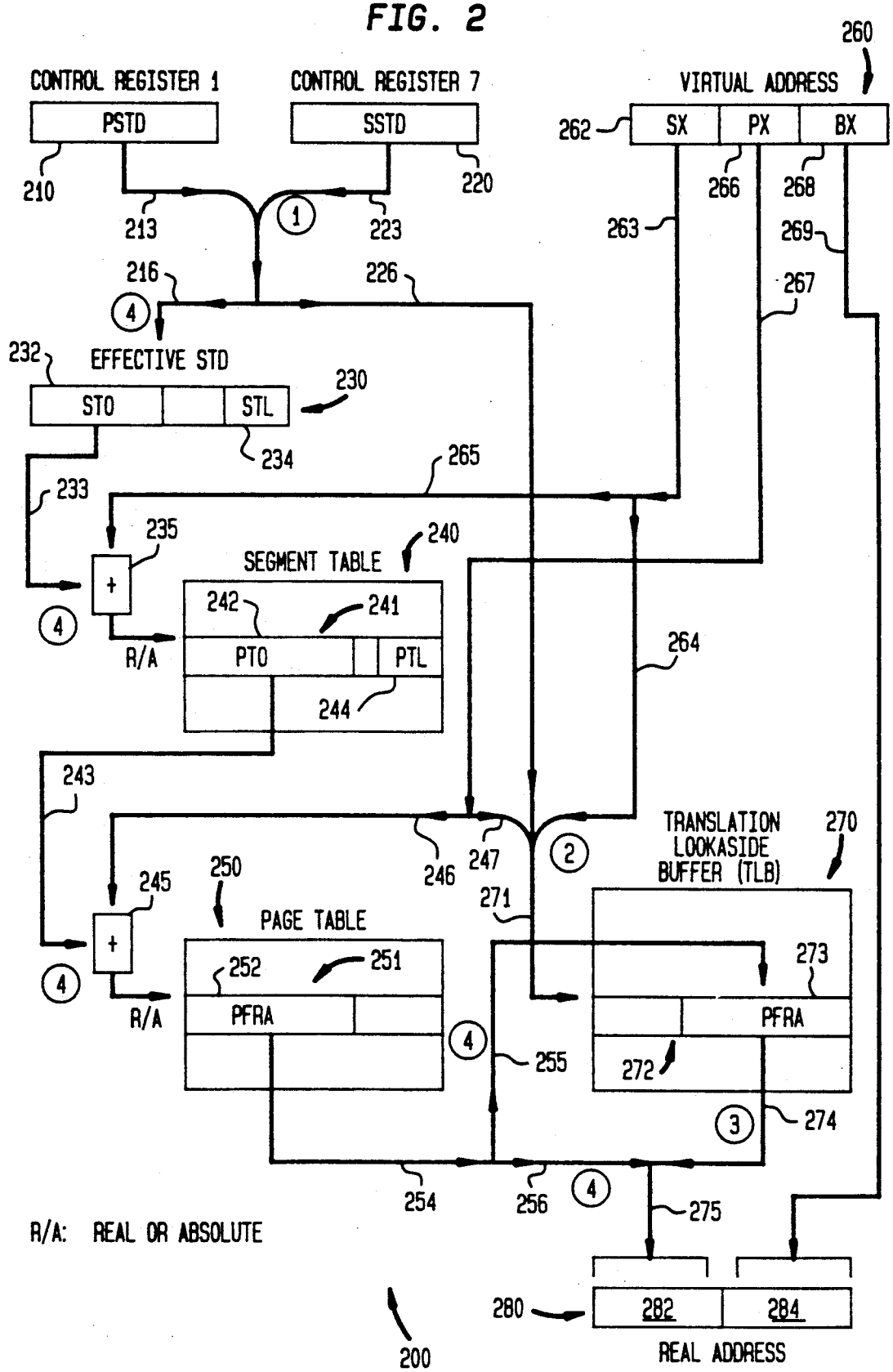
FIG. 2 depicts a simplified diagram of a virtual to real address translation process that occurs during on-going program execution in illustratively an IBM model 370/Extended Architecture mainframe computer.

Now, with the above overall description in mind, FIG. 2 depicts a simplified diagram of virtual to real address translation process 200 that occurs during on-going program execution in illustratively an IBM model 370/Extended Architecture mainframe computer.

In the model 370/Extended Architecture computer, a user can employ either a primary or secondary virtual address space. To the extent it is relevant here, primary virtual addresses utilize a primary segment table; while secondary addresses utilize a secondary segment table. Therefore, as contrasted with the description given above, a user of this particular computer may have two segment tables: a primary segment table and a secondary segment table. The processor in this computer assigns two registers, control register 1 labelled as register 210 and control register 7 labelled as register 220, to a user during current program execution. Registers 210 and 220 respectively hold the segment table designations (STDs) for translation of primary and secondary virtual addresses. Once the appropriate control register is selected, for reasons and in a manner both of which are not relevant here, address translation proceeds in the same fashion for either segment table. Inasmuch as both of these registers store 32 bits and have the same data format; the following discussion will primarily refer to register 210 and the primary segment table designation (PSTD) stored therein. Within this register as given in Table 1 below, the highest order bit (bit 0) is a control bit, not relevant here. The next nineteen bits (bits 1-19) store the primary segment table origin—PSTO (secondary segment table origin, SSTD, in register 220). The PSTO, with twelve zeroes, appended to the right, forms a real (or sometimes absolute) address that designates the beginning (origin) of this segment table. The next five bits (bits 20-24) are not used. The remaining seven bits (bits 25-31) store a number that specifies the primary segment table length—PSTL (secondary segment table length, SSTL, for register 220) in units of 64 bytes, thus making the length of the segment table variable in multiples of sixteen entries. The length of the primary segment table, in units of 64 bytes, is one more than the value stored in the PSTL field in register 210. The PSTL or SSTL value is used by the address translation process to establish whether the entry designated by a segment index (SX) portion, as described below, of a primary or secondary virtual address respectively falls within the primary or secondary segment table.

TABLE 1

Primary Segment Table Designation - Register 210

| X | PSTO | | PSTL |
|---|------|---|------| bits: 0  1            20   25    31 where: "X" denotes a control bit.

As noted above, the address translation process utilizes segments and pages. Here, each segment is a block of contiguous virtual addresses that spans 1M byte and begins at a 1M byte boundary. A virtual page is a block of sequential virtual addresses that spans 4K bytes and begins at a 4K byte boundary. An incoming virtual address, specifically address 260, is divided into three fields: bits 1-11 form segment index (SX) field 262, bits 12-19 form page index field 266, and bits 20-31 form byte index (BX) field 268. Bit 0 in the virtual address is not used. Segment and page tables are initially used to translate virtual to real addresses. As such, the contents of these tables reflect a current assignment of real storage within the main memory of the computer. As noted above, real storage is assigned in units of a full page frame with all the locations being assigned contiguously within a page frame. These page frames, as discussed above, are generally not contiguous in main memory, although corresponding virtual pages are contiguous in virtual address space.

With this in mind, address translation process 200 begins with the application of virtual address 260 thereto. First, as indicated by circled numeral "1", an effective segment table designation is first generated. Based upon whether the user is employing primary or secondary virtual addressing, the contents of register 210 or 220 are used in translation as symbolized by lines 213, 223 and 216 as an effective segment table designation, specifically designation 230. Then, as indicated by circled numeral "2", portions of the effective segment table designation and virtual address 260, typically segment and page indices 262 and 266, collectively symbolized by lines 226, 263, 264, 267, 247, and 271, are applied to TLB 270, to determine if a corresponding virtual page address is stored therein, and if so to access that address. To facilitate high speed searching through the TLB 270, the TLB is typically implemented as a hashed set-associative table in dedicated hardware circuitry. If a match between the fields used to search the TLB and an entry stored therein exists, then the page frame address in that entry, such as page frame address 273 in TLB entry 272, is accessed and applied, as symbolized via lines 274 and 275 and circled numeral "3", as the high order, i.e. page frame address 282, portion of real address 280. This portion is then concatenated with twelve-bit byte index 268 placed in byte field 284 to form real address 280. Having formed real address 280, address translation process 200 is now concluded.

However, if the desired page frame address does not reside in TLB 270, no match results and a TLB miss occurs. Consequently, full address translation, as indicated by all the circled numerals "4", must be performed as shown in the left side of FIG. 2. In particular, effective segment designation 230 is first stored within a register. The segment table origin (STO) residing in designation 230 points to the beginning of an appropriate segment table, e.g. segment table 240, for the user. From virtual address 260, the bits in segment index (SX) field 262 are appropriately routed, as symbolized by lines 263 and 265, along with the segment table origin field, as symbolized by line 233, to ADD process 235 which appropriately combines these fields to generate a real (or absolute) address into segment table 240. Specifically, the thirty-one bit address of the desired segment table entry is obtained, in real (or absolute) storage, by appending twelve zeroes to the right of bits 1-19 of the effective segment table designation and adding the value of segment index 262 from the incoming virtual address with two rightmost and eighteen leftmost zeroes appended thereto. When a carry into bit position zero of the address produced by ADD process 235 occurs, an addressing exception may be recognized or the carry may be ignored causing the segment table to wrap from $2^{31}-1$ to zero. All thirty-one bits of the resulting address produced by ADD process 235 to segment table 240 are used. As part of the segment table lookup process, bits 1-7 of virtual address 260 (the six most significant bits in the segment index) are compared against the value of the segment table length that resides in effective segment table designation 230 to establish whether, as noted above, the addressed segment table entry lies within the segment table, here segment table 240. If the value in the segment table length field is less than the value in the corresponding bit positions of virtual address 260, a segment translation exception is recognized.

Each entry in segment table 240, though simplified somewhat in FIG. 2, has the specific format shown in Table 2 below:

TABLE 2

Segment Table Entry

| 0 | Page Table Origin | I | C | PTL |
|---|-------------------|---|---|-----| bits: 0  1                          26  28  31 where: I is an invalid bit;
C is a common segment bit.

As shown above, the first bit in a segment table entry is set to a zero value. The next twenty-five bits (bits 1-25) with six zeroes appended to the right form the page table origin (PTO) for a specific page table. The PTO can be real or absolute. The invalid bit (I), bit 26, is set to a zero state to signify that the segment table entry is valid, i.e. meaningful, and available for use during subsequent address translation. If this bit is reset to one, this signifies that the associated segment table entry is not meaningful and can not be used during address translation. As such, if this entry is accessed therefor, a translation specification exception will then be recognized. The common segment bit (C), bit 27, identifies the manner through which the segment table entry can be used.

Specifically, if the value of the common segment bit is zero, then the associated segment is a so-called "private segment". In this case, this segment table entry and the page table it designates may only be used in association with the segment table origin that designates this particular segment table, i.e. table 240. Alternatively, if the value of the common segment bit is one, then the segment is a so-called "common segment". In this case, the segment table entry and the page it designates may continue to be used for translating addresses corresponding to the segment index even though a segment table other than table 240 has been specified by the segment table origin in effective segment table designation 230.

If no exceptions are recognized during segment table lookup, then the resulting entry fetched from segment table 240, here shown as entry 241, specifies, through the page table origin (PTO) field, the real (or absolute) address of the beginning of a specific page table and, through the page table length (PTL) field, the length of this page table.

Once page table entry 240 is obtained, this entry along with the page index in virtual address 260 are used to access page table 250 to obtain the page frame address corresponding to the virtual page address. In particular, segment table entry 241 obtained from segment table 240 is routed, as symbolized by line 243, to one input of ADD process 245. The page index (PX) is routed, as symbolized by lines 267 and 246 to another input of ADD process 245. This process generates a thirty-one bit real (or absolute) address to page table 250 by first appending six zeroes to the right of page table origin 242 and appending two rightmost and twenty-one leftmost zeroes to page index 266 and then adding the resultants together. A carry into bit position zero of the address produced by ADD process 245 may cause an addressing exception to be recognized, or the carry may be ignored, causing the page table to wrap from $2^{31}-1$ to zero. All thirty-one bits of the address to the page table are used. As part of the page table lookup process, the four leftmost bits of page index field 266 are compared against the bits in the page table length field 244 to establish whether the addressed page table entry lies within page table 250. If the value in page table length field 244 is less than the value in the four leftmost bits in page index field 266, then a page translation exception is recognized.

Each entry in page table 250, though simplified somewhat in FIG. 2, has the specific format shown in Table 3 below:

TABLE 3

Page Table Entry

| 0 | PFRA | 0 | I | P | 0 | unassigned |
|---|------|---|---|---|---|------------| bits: 0   1            20                          31 where: PFRA is a page frame real address, referred to herein as simply the page frame address;
I is an invalid bit; and
P is a page protection bit.

As shown above, the first bit in a page table entry is set to a zero value. The next twenty bits (bits 1-19) provide the leftmost twenty bits of the page frame address. When these bits are concatenated to the left of the twelve bit address in byte index field 268, a thirty-one bit real address results. The invalid bit (I), bit 21, specifies whether that page table entry is valid, i.e. meaningful, and available for use during translation of the current virtual address. When this bit is zero valued, this page table entry is meaningful and can be used during translation; otherwise, if this bit is a one, this page table entry is not meaningful and can not be used during translation. The page protection bit (P), bit 22, specifies whether stores (write operations) can be made into the corresponding page frame in main memory but does not affect fetch accesses from this page. If this bit is zero-valued, stores are allowed into this page; otherwise, if this bit is one, stores are disallowed. Bit positions 0, 20 and 23 of each page table entry must contain zeroes; else, a translation specification exception is recognized as part of the execution of an instruction that uses this page table entry for translation. Bit positions 24-31 of a page table entry are unassigned.

If no exceptions are recognized during page table lookup, then the entry fetched from the page table, here shown as entry 251, provides the page frame address for virtual address 260.

Figure 3:
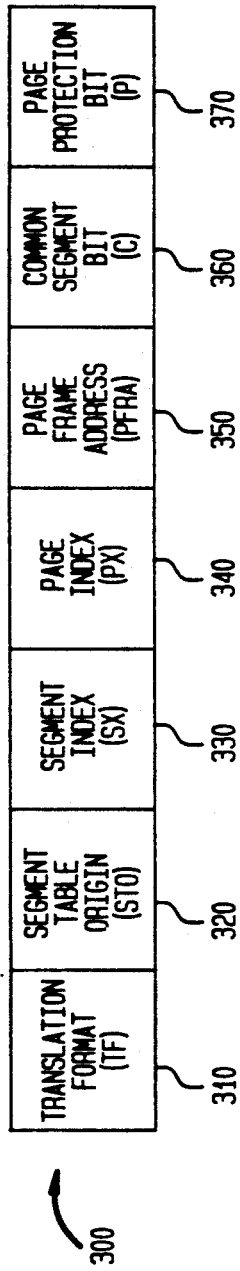
FIG. 3 depicts the layout of a typical entry which would be stored in a translation lookaside buffer (TLB) known in the art and employed in an IBM 370/Extended Architecture mainframe computer.

The resulting page frame address, here PFRA field 252, is routed, as symbolized by lines 254, 255 and 256, for storage within TLB 270 and to form the twenty high order bits of real address 280. In response to this page frame address, entry 273 (assuming now it does not yet exist) is created in TLB 270, as symbolized by line 255. This entry, as will be described in detail below in connection with FIG. 3, illustratively contains the virtual page address and the corresponding page frame address provided from the segment and page tables, along with the common segment bit from the corresponding segment table entry and the page protection bit from the corresponding page table entry. The TLB may be implemented in a variety of ways provided it stores the virtual and corresponding page frame address. For example, the TLB may contain only a few entries that pertain to the currently designated segment table, with each entry consisting of the leftmost portion of a virtual address and its corresponding page frame address and page protection bit. Alternatively, the TLB may contain arrays of values where the page frame address and page protection bit are selected on the basis of the effective segment table origin and the leftmost bits of the virtual address. Entries within the TLB are generally not explicitly addressable by a user program or the operating system.

To form real address 280, the twenty high order bits in PFRA field 252 are concatenated to the left of the contents of twelve bit byte index field 268, as symbolized by lines 256, 275 and 269, to form fields 282 and 284 that collectively comprise real address 280. Once real address 280 is formed, address translation process 200 is completed. For further information regarding this specific address translation process, see *IBM System/370 Extended Architecture—Principles of Operation*, IBM Publication Number SA22-7085-1, Second Edition, January 1987 (1987, International Business Machines Corporation) pages 3-21 to 3-36.

Having described address translation process employed in an IBM 370/Extended Architecture mainframe computer, FIG. 3 depicts the layout of typical illustrative entry 300 which would be stored in the TLB in such a computer.

This entry contains translation format (TF) field 310 which designates the addressing mode in use for this entry. In particular, this field specifies whether primary or secondary virtual addressing is to be used. Successive STO, SX and PX fields 320, 330 and 340 respectively contain the segment table origin, segment index and page index values obtained from corresponding segment and page table entries. The next field, PFRA field 350, contains the page frame address obtained from the page table entry. Thereafter, fields 360 and 370 contain the common segment (C) bit and page protection (P) bit respectively obtained from the segment and page table entries. Depending upon the specific implementation used for a TLB, each TLB entry can contain more or less information obtained from the corresponding segment and page table entries than that specifically shown in entry 300. For example, a TLB entry can additionally contain the page table origin and page table length.

While, use of a TLB during address translation provides a substantial improvement in translation and overall memory access speed, in certain instances, use of a TLB carries serious drawbacks which limit its utility.

Being hardware based, TLBs, such as TLB 270 shown in FIG. 2, are finite in size and can only store a certain number of the most recently translated virtual page addresses. As such, various user programs that operate on large amounts of data, such as large matrices, routinely trigger successive TLB misses. The occurrence of a TLB miss causes the full address translation process, including accessing the segment and page tables and updating the TLB, to be performed along with its concomitant processing delays. If these misses occur frequently enough, then the efficiency gained through the use of a TLB will seriously degrade. Large matrices and other similar data structures engender a large number of TLB misses, therefore producing a large TLB miss ratio and significant processing delays.

While a TLB could be greatly increased to a size which is believed to significantly reduce the likelihood that a large number of TLB misses will occur, doing so is expensive and with certain programs and/or data structures ineffective to prevent large number of successive TLB misses. Alternatively, the size of a virtual page could be increased in an effort to reduce the number of address translations that are expected to occur. Inasmuch as memory inefficiencies increase with increases in page size, these inefficiencies effectively preclude the use of a large page size in a general purpose mainframe computer.

Advantageously, in accordance with the teachings of my invention, I have substantially reduced the number of TLB misses that occur during address translation. In particular, through my invention, whenever a TLB miss occurs, a plurality of successive contiguous page addresses in one address space, e.g. virtual addresses, are translated, on a pre-fetch basis, into page addresses in a different address space, e.g. page frame (real) addresses, and then stored in the TLB. Preferably one TLB entry (though more such entries can be used) will hold the real addresses for these multiple contiguous virtual page addresses. This approach sharply contrasts with translating only one virtual page address and storing only that address and its corresponding page frame address within one TLB entry as now occurs in TLBs known in the art.

In this regard, I have observed that the occurrence of spatial and temporal localities of reference is not limited to merely encompassing memory data that occurs within a single virtual page, i.e. at a relatively fine granularity, but rather extends, at levels of increasingly large granularity, to encompass memory data that resides in a series of successive contiguous virtual pages. Hence, after a TLB miss occurs for a given virtual address in a given page, then a relatively high likelihood exists that, within a relatively short delay time thereafter, addresses located within a series of virtual pages that are contiguous to the given virtual page will also be accessed as well and require translation. Hence, by translating multiple successive contiguous virtual page addresses into corresponding page frame addresses on a pre-fetch basis at each TLB miss—as taught by my invention, the number of TLB misses that would typically occur during program execution could be significantly reduced over that which would otherwise occur in the art. Consequently, for various programs and/or large matrices or other data structures that heretofore engender a large number of TLB misses, use of my invention would advantageously reduce both the number of TLB misses that would otherwise occur and the concomitant processing overhead and delay otherwise required to process these programs and/or access this data.

While my invention is specifically described herein in the context of translating virtual to real addresses, my invention is also applicable for use in translating real to virtual addresses for application in those computers that utilize inverted segment and page tables. Though such computers do not yet appear to utilize a TLB, an inverted TLB (using addressing opposite to that described above) and specifically one employing my invention could be incorporated into such a computer to significantly expedite address translation. For the sake of simplicity, the following discussion will center on virtual to real address translation.

In accordance with the specific teachings of a preferred embodiment of my invention, a block of virtual page addresses are translated in response to a TLB miss. Each block has a fixed number of, illustratively four, consecutive contiguous virtual page addresses. The first virtual page address is translated through segment and page table lookup operations to yield a corresponding page frame address. Inasmuch as successive virtual pages are contiguous in virtual address space, then, given an address for a first virtual page in a block, each successive virtual page address in that block can be readily formed by simply and appropriately incrementing the address of the first virtual page to point to and access successive entries in the page table. As such, due to the contiguous nature of virtual pages, each successive virtual page in the block is usually translated only through page table lookup operations to yield corresponding page frame addresses. All the virtual and corresponding page frame addresses for the pages in the block are then stored within the TLB.

Figure 4:
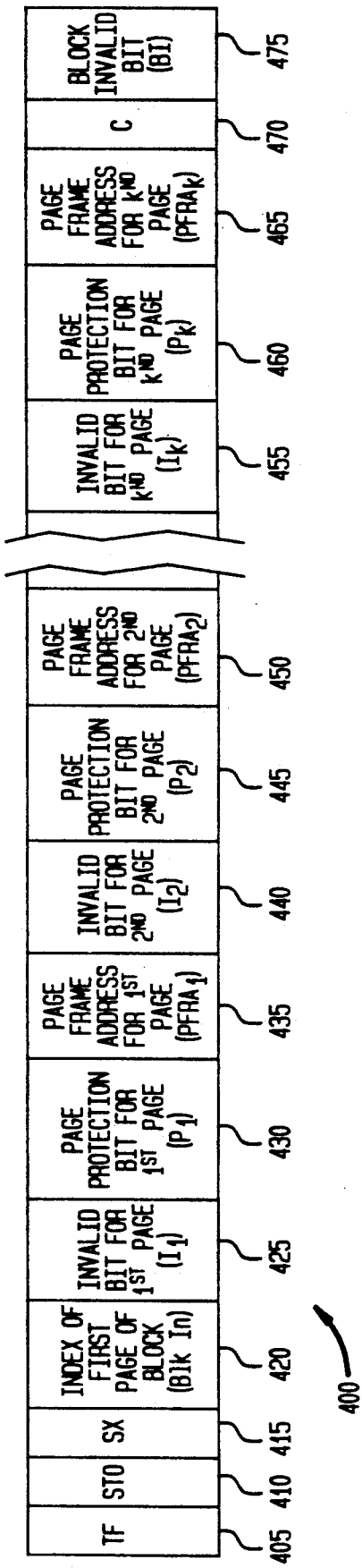
FIG. 4 depicts the layout of an entry, constructed in accordance with my inventive teachings, that would be stored within a TLB.

With this in mind, FIG. 4 depicts the layout of typical TLB entry 400 that incorporates my inventive teachings. This entry contains all the address translation information generated for a block of illustratively "k" virtual pages, i.e. a "virtual block". As shown, TLB entry 400 is formed of translation format (TF) field 405, followed by segment table origin field (STO) and segment index (SX) fields 410 and 415, respectively. Inasmuch as the information stored within these fields is common for all the virtual pages contained within the block, these fields occur only once within entry 400. Field 420 stores the block index (BLk In), i.e. the block address within the page table, of the first page in the associated block. To readily access TLB entry 400, this entry is hashed into the TLB, in a well known manner, using various bits in the virtual address representation.

Successive fields contain invalid bits ($I_1, I_2, \ldots, I_k$), page protection bits ($P_1, P_2, \ldots, P_k$) and page frame addresses ($PFRA_1, PFRA_2, \ldots, PFRA_k$) for all the virtual pages in the block. Specifically, one-bit fields 425, 440 and 455 contain the invalid (I) bits for the first, second and $k^{th}$ virtual pages in the block. One-bit fields 430, 445 and 460 contain the page protection (P) bits for the first, second and $k^{th}$ virtual pages in the block. Nineteen-bit fields 435, 450 and 465 contain the corresponding page frame addresses for these virtual pages. Field 470 contains the common segment (C) bit for this block. Field 475 contains a block invalid (BI) bit which can be used to validate the entire TLB entry in the same fashion as each invalid bit, I, validates the meaningfulness of a corresponding page table entry. Entries in the TLB could also be dynamically invalidated through use of special operating system commands, such as, for example, IPTE (invalidate page table entry) or PTLB (purge the TLB), which set the appropriate invalid bit(s) to the value one. A special operating system command could also be implemented to appropriately invalidate an entire block entry in the TLB.

With my inventive TLB containing block rather than page based entries, TLB misses can now occur either for a block address, i.e. a TLB block miss, or for a page address, i.e. a TLB page miss. In the former instance, page frame addresses for an entire block of virtual pages are simply not stored within a TLB entry; while, in the latter instance, a page frame address within a block of virtual addresses is either not stored within a TLB entry or, if so stored, is invalid.

FIGS. 5A and 5B collectively depict an overall high level flowchart of Memory Access and TLB Entry Creation Process 500 that operates in conjunction with a TLB and also embodies the teachings of my present invention; the correct alignment of the drawing sheets for these figures is shown in FIG. 5. This routine, when executed, accesses stored entries in my inventive TLB and creates new entries for virtual blocks therein. This routine executes within address translation facility 110, as shown in FIG. 1. In addition, the overall virtual to real address translation process which includes the use of my inventive TLB is essentially the same as process 200, shown in FIG. 2 and described above, with the exception of the operations shown in routine 500 depicted in FIGS. 5A and 5B and the use of my inventive TLB entry 400 shown in FIG. 4.

Upon entry into routine 500, as shown in FIGS. 5A and 5B, execution is directed to block 505. This block, when executed, hashes the segment and block addresses for an incoming virtual address into the TLB in order to locate a corresponding TLB entry and, by so doing, accordingly produce TLB block and page hits or misses. Thereafter, execution proceeds to decision block 510 which determines whether, based upon this access, a TLB block miss has just occurred, i.e. that the TLB does not contain an entry for a given virtual block. In making this determination, decision block 510 attempts to find a match between the values of the segment table origin (STO filed 410 shown in FIG. 4), the segment index (SX field 415) and the block index (Blk In field 420) fields in an incoming virtual address and the values of those fields in an entry in the TLB, conditioned on that entry having a zero-valued block invalid (BI field 475) bit. If such a match with a zero-valued block invalid bit is found, then a block hit results; otherwise, a block miss occurs. In the event that a TLB block miss has occurred, decision block 510, as shown in FIGS. 5A and 5B, routes execution, via YES path 513 and path 527, to decision block 550, which will be discussed below. Alternatively, if a TLB block hit has occurred, then decision block 510 routes execution, via NO path 516, to decision block 520. This latter decision block determines whether, based upon this access, a TLB page miss has just occurred, i.e. that either the TLB does not contain an entry containing a page frame address for a given virtual page or that the page frame address which does exist in the TLB entry for this block is itself invalid, i.e. the invalid bit (I) for this page frame address is one. In the event that a TLB page miss has occurred, decision block 520 routes execution, via YES path 523 and path 527, to decision block 550.

If, however, a TLB page hit has occurred, then decision block 520 routes execution, via NO path 526, to block 530. This latter block, when executed, reads the desired page frame address and page protection (P) bit from the accessed TLB entry. Thereafter, block 535 is executed to form a real memory address, by concatenating the accessed page frame address with a virtual byte index in the virtual address being translated. Once this occurred, execution proceeds to block 540 to access the desired location in main memory using the real memory address. In certain memory data access facilities, this location may appropriately reside in any of a variety of intermediate memory hierarchies, such as for example high-speed buffers (so-called memory caches) or the like. Once this access occurs, address translation is complete and execution exits from routine 500.

Alternatively, in the event that either a block or page miss occurs, execution proceeds to decision block 550, as noted above, via YES paths 513 or 523 and path 527. Decision block 550, when executed, determines whether the segment table entry is valid. In the event this entry is not valid, then execution proceeds, via NO path 553, to block 560. Block 560, when executed, instructs the operating system to construct a page table for the user. Once this instruction is provided, execution exits from routine 500. Alternatively, if the segment table entry is valid, then execution proceeds, via YES path 555 emanating from decision block 550, to decision block 565. This latter decision block, when executed, determines whether the page table entry is valid. In the event the page table entry is not valid, then execution proceeds, via NO path 567, to block 570. Block 570, when executed, triggers the operating system to issue a page fault. Once this occurs, execution exits from routine 500. Block 550 as well as many of the subsequent blocks in routine 500 would typically be implemented in microcode.

If both the segment and the page table entries are valid, then decision block 565 routes execution, via YES path 569, to block 575. This latter block, when executed, successively translates, through table lookup operations, four contiguous virtual page addresses, one of which being the incoming virtual page address, located within a common block into corresponding page frame addresses. The first virtual address in the block is translated typically through both segment and page table lookup operations; while each of the three successive contiguous virtual page addresses is determined by accessing a successive corresponding entry in the page table. Once four corresponding page frame addresses are obtained, block 575 delivers these addresses to the TLB. If an appropriate block entry exists in the TLB, such as would arise for example when a page fault occurs, then block 575 inserts these new addresses into that TLB block entry by simply over-writing this entry. However, if this block entry is missing from the TLB, such as in the case of a TLB block fault, then block 575 creates a new block entry containing these new addresses in the TLB. This new entry is typically over-written onto the least recently used block entry of the hash class in the TLB. The determination of the least recently used entry and the actual writing of the entry into the TLB is handled, as noted above, through dedicated high speed circuitry that is used as part of the TLB circuitry. Once block 575 fully executes, then execution loops back from this block, via path 580, to block 530 to access, given the current virtual page address, its corresponding page frame address from the TLB.

My inventive TLB entries, particularly for a block of four contiguous virtual addresses, can be readily implemented with little, if any, performance penalty in present mainframe computers. Currently, to increase processing speed, a number of mainframe computers operate using a quadword bandwidth to transfer four words in parallel through the processor. If only one such word is ultimately desired, the remaining three words are simply discarded. Hence, with such an available bandwidth, four contiguous virtual addresses can be translated essentially simultaneously into page frame addresses and, through an appropriate single cycle hardware barrel shift, shifted into corresponding locations within a common TLB entry and then ultimately stored into the TLB. With a quadword bandwidth, an entire TLB entry could be obtained using one TLB fetch. Alternatively, if a double word bandwidth were to be used instead, then two fetches from the TLB would be needed to access all four page frame addresses in a common TLB entry.

Through empirical simulations, I have determined that a significant reduction in TLB misses occurs where each TLB entry contains as few as four successive page frame addresses. With this number of page frame addresses in each TLB entry, use of my inventive TLB only needs to contain approximately twice the storage capacity of a conventional TLB. Since the expense associated with doubling the capacity of a TLB is often quite small and simple table lookup operations, as noted above, are needed to translate multiple contiguous virtual page addresses upon a TLB miss, my invention can be easily and inexpensively incorporated into a general purpose computer to produce, in many instances, a significant reduction in the number of TLB misses. Alternatively, if the size of a TLB is to remain constant, then, through use of my inventive block based format for each TLB entry rather than the single page based address format as known in the art (such as that used in TLB entry 300 discussed above in connection with FIG. 3), the TLB can store page frame address for twice as many virtual pages as has previously occurred in TLBs known in the art.

By now, those skilled in the art clearly realize that although I have specifically shown and described my invention in conjunction with TLB entries having page frame addresses for four contiguous virtual pages, my invention can be readily utilized in conjunction with TLB entries that each contains corresponding page frame addresses (and associated invalid bits) for a block having any number, e.g. "p", of contiguous virtual page addresses. Furthermore, the block size could be dynamically varied to adapt the performance of the TLB in response to a varying TLB miss rate in order, for example, to continually minimize this rate for the present program and/or data being processed; however, such an approach would likely be quite complex.

Furthermore, the contiguous virtual page addresses, illustratively four, that are stored within a common TLB entry can be selected in any one of many different ways. I have described the address selection process as starting with a given virtual page address that, when presented for translation, is presumed to be situated at a lower block boundary and is followed by as many successive contiguous virtual page addresses located thereafter in virtual memory as are needed, here illustratively three, to fill the TLB entry. Alternatively, a number, "n", of contiguous virtual page addresses immediately preceding the given virtual page address and a number "m" of successive contiguous virtual page addresses situated immediately after the given virtual address can be used, provided the value of "p" equals "m+n+1". A parameter can be set and dynamically varied, as needed, to dynamically select the values of "n" and "m" according to the expected spatial locality of reference of the memory data situated at these virtual locations. However, with such a dynamic arrangement, the selection of the virtual addresses that are used to form a TLB entry will vary among different TLB entries. As such, in order to access the proper page frame address for a given virtual page address from a TLB entry formed through use of such dynamic selection, information would need to be stored within that entry itself which specifies the relative position of each page frame address in that entry with respect to the page frame address associated with a specific virtual page address which triggered the creation of that TLB entry. This information would then need to be accessed and interpreted to determine whether a given TLB entry contained the page frame address for a given incoming virtual page address. Accordingly, use of such a dynamic selection process is likely to be far more complex than and is unlikely to yield any performance benefits over merely fixing the number, e.g. at four, and the spatial correspondence of the contiguous virtual addresses, e.g. at a fixed lower block partition containing a current virtual address and three contiguous virtual addresses successively following thereafter, for a block of virtual page addresses that will be translated through the segment and page tables at each TLB miss.

In addition, those skilled in the art now readily appreciate that my invention is not limited to use in "block based" TLBs or translating only one block of virtual page addresses upon a TLB miss. In this regard, my invention can be readily implemented in conventional TLBs that do not utilize a "block based" entry. With such TLBs, use of my invention would advantageously permit multiple contiguous virtual page addresses to be translated and stored in separate TLB entries in response to a single TLB miss. The allocation of all of these entries could be handled in parallel by appropriate, though likely complex, hardware situated within the TLB itself. It is also quite possible to utilize my invention in a TLB such that each TLB miss creates multiple TLB block entries rather than a single such entry. With either of these two approaches, the benefits of faster memory access achievable through translating multiple addresses at each TLB miss can be obtained without fixed block size constraints. For instance, given the number of translated addresses that should be produced at each TLB miss, then an appropriate number of blocks of virtual page addresses could be translated at each such miss, where each block contains a fixed number of, e.g. four, contiguous virtual page addresses. Specifically, for certain processing applications, e.g. vector processing, a currently missed block and the next sequential block of virtual page addresses could be translated together upon the occurrence of a single TLB miss. Hence, the number of addresses that are translated as well as the specific manner through which the resulting translated addresses are stored in the TLB, i.e. using one or more TLB entries each containing one or more translated addresses, can be varied, as appropriate, to suit the needs of a given processing application.

Although a preferred embodiment of the present invention has been shown and described in detail herein, many other varied embodiments that incorporate the teachings of my present invention may be easily constructed by those skilled in the art.

I claim:

1. In a digital computer, a method for use in translating an incoming memory address in a first address space into a corresponding memory address in a second address space comprising the steps of:
   translating, in response to a miss in a translation lookaside buffer (TLB), a plurality of successive contiguous page addresses in said first address space into a corresponding plurality of page addresses in said second address space, said plurality of successive contiguous page addresses in said first address space containing a page address of said incoming memory address; and
   storing, in the TLB, said plurality of page addresses in said second address space.

2. The method in claim 1 wherein said storing step comprises the steps of:
   creating a TLB entry containing a first one of said plurality of page addressees in said first address space and each of said plurality of page addresses in said second address space; and
   inserting said TLB entry into the TLB.

3. The method in claim 2 wherein said first address space is virtual address space containing a plurality of virtual page addresses and said second address space is real address space containing a plurality real page addresses.

4. The method of claim 3 further comprising the steps of:
   searching the TLB, in response to an incoming virtual page address contained in an incoming virtual memory address, for a specific TLB entry that contains a plurality of real page addresses for a block of corresponding contiguous virtual page addresses containing said incoming virtual page address;
   generating, in response to said searching step, a TLB miss in the event said specific TLB entry does not exist in the TLB; and
   determining, in response to said searching step and the existence of said specific TLB entry, whether one of said plurality of real page addresses stored therein and corresponding to said incoming virtual page address is valid; and, if valid, reading said one of said plurality of real page addresses from said TLB entry as a corresponding translated real page address, otherwise generating a TLB miss.

5. The method in claim 4 further comprising the step of forming a real memory address by concatenating said one of said plurality of real page addresses with a value of a byte index field from said incoming virtual memory address, wherein said real memory address contains said one of said plurality of real page address followed by a byte index field value.

6. The method in claim 3 wherein said creating step further comprises the step of incorporating within said TLB entry a separate bit for each of said plurality of real page addresses, wherein said separate bit indicates whether a corresponding one of said plurality of real page addresses is valid or not.

7. The method in claim 6 wherein said TLB entry further comprises a block index field for identifying a block address for the first one of said plurality of virtual page addresses within said page table.

8. The method in claim 7 wherein said TLB entry further comprises segment table origin and segment index fields for respectively identifying an origin of a segment table and a particular segment table entry therein.

9. The method in claim 8 wherein said inserting step comprises the step of hashing the TLB entry into the TLB through values of the segment and block index fields contained in the TLB entry.

10. The method in claim 6 wherein a first one of said plurality of virtual page addresses lies on a partition of a pre-defined block of virtual page addresses in a page table.

11. The method in claim 10 wherein said pre-defined block comprises four successive contiguous virtual page addresses.

12. The method in claim 10 wherein said translating step further comprises the steps of:
   first translating the first one of said plurality of virtual page addresses in said pre-defined block through appropriate entries in both a segment table and the page table to yield a first page table entry in said page table and, from said first page table entry, obtaining a corresponding one of said plurality of real page addresses; and
   second translating a second one and each successive remaining one of said plurality of virtual page addresses in said pre-defined block into corresponding ones of said plurality of real page addresses by accessing, from the page table, successive contiguous entries following said first page table entry and obtaining from each such successive entry a remaining corresponding one of said plurality of real page addresses.

13. The method in claim 12 wherein said first translating step comprises the steps of:
   first accessing the segment table, in response to a segment table origin address and a value of a segment index present in a virtual memory address, to provide therefrom a segment table entry;
   reading a page table origin address from said segment table entry;
   second accessing the page table, in response to said page table origin address and a value of a page index present in the virtual memory address, in order to provide therefrom said first page table entry; and
   reading a first real page address from said first page table entry.

14. In a digital computer, a method for use in translating an incoming virtual memory address into a corresponding real memory address comprising the steps of:
   accessing a translation lookaside buffer (TLB) comprising:

searching the TLB, in response to an incoming virtual page address contained in said incoming virtual memory address, for a TLB entry that contains real page addresses for a block of corresponding contiguous virtual page addresses containing said incoming virtual page address;

generating, in response to said searching step, a TLB miss in the event said TLB entry does not exist in the TLB; and determining, in response to said searching step and the existence of said TLB entry, whether one of said real page addresses stored therein and corresponding to said incoming virtual page address is valid; and if valid, reading said one real page address from said TLB entry as a corresponding translated real page address, otherwise generating a TLB miss; and updating the TLB, in response to said TLB miss, comprising:

translating a plurality of successive contiguous virtual page addresses into a corresponding plurality of real page addresses, said plurality of successive contiguous virtual page addresses containing said incoming virtual page address and forming the block of said contiguous virtual page addresses;

creating a new TLB entry for said block, said new TLB entry containing a first one of said plurality of successive contiguous virtual page addresses and each of said plurality of real page addresses; and inserting said new TLB entry into the TLB.

15. The method in claim 14 further comprising the step of forming a real memory address by concatenating said one real page address with a value of a byte index field from said incoming virtual memory address, wherein said real memory address contains said one real page address followed by said byte index field value.

16. The method in claim 14 wherein said creating step further comprises the step of incorporating said TLB entry a separate bit for each of said plurality of real page addresses, wherein said separate bit indicates whether a corresponding one of said plurality of real page addresses is valid or not.

17. The method of claim 16 wherein a first one of said successive contiguous virtual page addresses lies on a partition of the block of virtual page addresses in a page table.

18. The method in claim 17 wherein said translating step further comprises the steps of:

first translating the first one of said plurality of successive contiguous virtual page addresses in said block through appropriate entries in both a segment table and the page table to yield a first page table entry in said page table and, from said first page table entry, obtaining a corresponding one of said plurality of real page addresses; and second translating a second one and each successive remaining one of said plurality of virtual page addresses in said block into corresponding ones of said plurality of real page addresses by accessing, from the page table, successive contiguous entries following said first page table entry and obtaining from each such successive entry a remaining corresponding one of said plurality of real page addresses.

19. The method in claim 18 wherein said first translating step comprises the steps of:

first accessing the segment table, in response to a segment table origin address and a value of a segment index present in the incoming virtual memory address, to provide therefrom a segment table entry;

reading a page table origin address from said segment table entry;

second accessing the page table, in response to said page table origin address and a value of a page index present in the incoming virtual memory address, in order to provide therefrom said first page table entry; and reading said first real page address from said first page table entry.

20. The method in claim 16 wherein said block comprises four successive contiguous virtual page addresses.

21. In a digital computer, apparatus for use in translating an incoming memory address in a first address space into a corresponding memory address in a second address space comprising:

a translation lookaside buffer (TLB);

means for translating, in response to a miss in the TLB, a plurality of successive contiguous page addresses in said first address space into a corresponding plurality of page addresses in said second address space, said plurality of page addresses in said first address space containing a page address of said incoming memory address; and means for storing, in the TLB, said plurality of page addresses in said second address space.

22. The apparatus in claim 21 wherein said TLB is formed of TLB entries, each of said entries comprising a first one of said plurality of page addresses in said first address space and each of said plurality of page addresses in said second address space.

23. The method in claim 22 wherein said first address space is virtual address space containing a plurality of virtual page addresses and said second address space is real address space containing a plurality of real page addresses.

24. The apparatus in claim 23 wherein each of said TLB entries further comprises a separate bit for each of said plurality of real page addresses, wherein said separate bit indicates whether a corresponding one of said plurality of real page addresses is valid or not.

25. The apparatus in claim 24 wherein the first one of said virtual page addresses lies on a partition of a predefined block of virtual page addresses in a page table.

26. The apparatus in claim 25 wherein said predefined block comprises four successive contiguous virtual page addresses.

27. The apparatus in claim 24 wherein said each of said TLB entries further comprises a block index field for identifying a block address for the first one of said plurality of virtual page addresses within said page table.

28. The apparatus in claim 27 wherein each of said TLB entries further comprises segment table origin and segment index fields for respectively identifying an origin of a segment table and a particular segment table entry therein.

* * * * *